United States Patent [19]

van Gulick

[11] Patent Number: 5,084,498
[45] Date of Patent: Jan. 28, 1992

[54] PROCESS FOR STABILIZING COPOLYMERS OF ETHYLENICALLY UNSATURATED FLUORO COMPOUNDS WITH VINYL ETHERS

[75] Inventor: Norman M. van Gulick, Wilmington, Del.

[73] Assignee: E. I. Du Pont de Nemours and Company, Wilmington, Del.

[21] Appl. No.: 596,552

[22] Filed: Oct. 17, 1990

[51] Int. Cl.$^5$ .................. C08K 5/07; C08F 220/22; C08F 216/12; C08F 214/18
[52] U.S. Cl. .................. 524/358; 526/245; 526/247; 526/248; 526/332
[58] Field of Search .................. 524/356, 358, 770

[56] References Cited

U.S. PATENT DOCUMENTS 3,390,203  6/1968  Engelhardt .................. 524/400
4,542,177  9/1985  Kriek et al. .................. 524/98

FOREIGN PATENT DOCUMENTS 62-104862   5/1987  Japan .
62-292813  12/1987  Japan .
62-292814  12/1987  Japan .
2-140210    5/1990  Japan .

*Primary Examiner*—Joseph L. Schofer
*Assistant Examiner*—Wu C. Cheng
*Attorney, Agent, or Firm*—Paul R. Steyermark

[57] ABSTRACT

A copolymer of an unsaturated fluoro compound with a vinyl ether and, optionally, with at least one additional ethylenically unsaturated monomer can be stabilized against gelling by the addition, either to the copolymerization reaction or to the copolymer in solution or in aqueous dispersion, of a 2,2-unsubstituted alicyclic 1,3-diketone in the presence of the enolate ion of said ketone, which enolate may be formed in situ. Solutions and dispersions of such copolymers are very useful in hard, weather-resistant finishes, for example, those used for bridge ironwork and architectural maintenance and in automotive applications.

25 Claims, No Drawings

PROCESS FOR STABILIZING COPOLYMERS OF ETHYLENICALLY UNSATURATED FLUORO COMPOUNDS WITH VINYL ETHERS

BACKGROUND OF THE INVENTION

This invention relates to a process for stabilizing copolymers of ethylenically unsaturated fluoro compounds with vinyl ethers against gel formation, the stabilized copolymers being particularly useful as components of high quality coatings and finishes, especially for bridge ironwork and architectural maintenance and in automotive applications.

Copolymers of ethylenically unsaturated fluoro compounds, especially of fluoroolefins, with vinyl ethers as well as coating compositions containing such copolymers are well known, for example, from U.S. Pat. Nos. 3,306,879 (Pattison); 3,390,203 (Engelhardt); 3,429,845 (Bechtold et al.); 3,476,827 (Engelhardt); 3,762,940 (Bechtold); and 4,859,755 (Schlipf et al.), all of which are incorporated by reference herein.

In coating applications, the coating compositions frequently are applied from a solution in an organic solvent, so that good solubility of such compositions and stability of the solutions are important. Unfortunately, copolymers of ethylenically unsaturated fluoro compounds with vinyl ethers have a tendency to gel. Gelation can begin in the free radical-initiated copolymerization process itself or later, upon standing of a copolymer-containing composition or of isolated copolymer. Attempts have been made in the past to improve the stability of solutions of such copolymers by adding a tertiary organic amine or a tertiary organic phosphine to the solution, or by conducting the copolymerization in the presence of a 2,2,6,6-tetrasubstituted piperidine, as described in Japanese laid-open (Kokai) patent applications of Dainippon Ink & Chemicals, Inc., publication numbers 62-292813, 62-104814, and 62-292814, respectively. As another solution, Dainippon suggests the incorporation in the copolymer of a tertiary amine group-containing comonomer, as disclosed in Japanese laid-open application 2-140210.

Even when copolymers of ethylenically unsaturated fluoro compounds with vinyl ethers are used in aqueous dispersions, such as, for example, latices, the presence of gel is undesirable because such dispersions are nonuniform and difficult to apply and give uneven, poor quality coatings.

Addition of amines either to the copolymers or to the copolymerization reaction is said to be effective in preventing gelling. It seems that one of the purposes of the amine is to neutralize any acid that may be initially present or subsequently formed. This method of stabilizing the copolymers often has the shortcoming of imparting to the compositions an undesirable yellow color. Further, lower boiling organic amines sooner or later evaporate from the compositions, so that their stabilizing effect is lost.

It is, therefore, desirable to provide a process for stabilizing copolymers of ethylenically unsaturated fluoro compounds with vinyl ethers which would not have the above shortcomings.

SUMMARY OF THE INVENTION

According to the present invention, there is provided a process for stabilizing against gel formation a copolymer of the following comonomers in their approximate proportions given below:

(1) 10–60 mole percent of at least one ethylenically unsaturated fluoro compound represented by the formula (1)

where each one of W, X, Y, and Z substituents can be a fluorine atom; provided that at least two of W, X, Y, and Z substituents are fluorine atoms;

at most two of W, X, Y, and Z substituents can be independently H, Cl, or -$OR_f$, where $R_f$ is a $C_1$-$C_{12}$ fluoroalkyl group; provided that two -$OR_f$ groups joined together can be part of a cyclic structure; and at most one of W, X, Y, and Z substituents can be Br or -$CF_2R_f'$, where $R_f'$ is a $C_1$-$C_{12}$ fluoroalkyl group;

provided that each one of $R_f$ and $R_f'$ may be further substituted with one or more functional groups providing cure sites;

(2) 10–60 mole percent of at least one vinyl ether $CH_2$=CH-O-R, wherein R is a $C_1$-$C_{18}$ aliphatic or alicyclic group, which may be further substituted with one or more functional groups that do not inhibit free radical copolymerization, including functional groups that provide cure sites; and, (3) 0–80 mole percent of at least one other ethylenically unsaturated comonomer that does not substantially increase the risk of gelation, the total amount of all the above monomers adding up to 100 mole percent;

said process comprising adding either to the free-radical copolymerization reaction or to the copolymer a stabilizing amount of about 0.1–400 millimoles of a 2,2-unsubstituted alicyclic 1,3-diketone per mole of vinyl ether, whether the vinyl ether is present as a comonomer in the copolymerization reaction or as a copolymerized comonomer in the copolymer, in the presence of the enolate ion of said ketone; provided that, when the stabilization is performed in an aqueous medium, the pH of the aqueous medium must be at all times maintained at at least 5 but not over 10.

DETAILED DESCRIPTION OF THE INVENTION

Typical ethylenically unsaturated fluoro compounds of formula (1), above, useful in making the copolymers to be stabilized according to the process of this invention include the following representative monomers: tetrafluoroethylene, hexafluoropropene-1, octadecafluorononene-1, 1-hydropentafluoropropene-1, 2-hydropentafluoropropene-1, chlorotrifluoroethylene, perfluoro(3-oxabutene-1), perfluoro(3-oxahexene-1), perfluoro(2,2-dimethyl-1,3-dioxole), perfluoro(2-methylene-4-methyl-1,3-dioxolane), and vinylidene fluoride.

Other suitable ethylenically unsaturated fluoro compounds of formula (1), above, contain functional groups that provide cure sites. Such cure sites, may be, for example, nitrile groups, ester groups, and bromine or iodine atoms. Ethylenically unsaturated fluoro compounds containing functional groups that provide cure sites are well known to the art. Examples are perfluoro(5-bromo-3-oxapentene-1), bromotrifluoroethylene, $CF_2=CFO[CF_2CF(CF_3)O]_mCF_2CF_2CN$, and $CF_2=CFO[CF_2CF(CF_3)O]_mCF_2CF_2COOR'$, where m is usually 0-3 and R' is a $C_{1-4}$ alkyl group.

Typical vinyl ethers include simple alkyl and alicyclic vinyl ethers as well as alkyl and alicyclic vinyl ethers carrying further substituents, especially cure site functionalities. Typical simple vinyl ethers are methyl vinyl ether, ethyl vinyl ether, butyl vinyl ether, isobutyl vinyl ether, octyl vinyl ether, dodecyl vinyl ether, octadecyl vinyl ether, 2-ethylhexyl vinyl ether, cyclopentyl vinyl ether, and cyclohexyl vinyl ether.

Vinyl ethers containing cure site functionalities include haloalkyl and hydroxyalkyl vinyl ethers such as, for example, 2-chloroethyl vinyl ether, 2-bromoethyl vinyl ether, 2-hydroxyethyl vinyl ether, 3-hydroxypropyl vinyl ether, 4-hydroxybutyl vinyl ether, 6-hydroxyhexyl vinyl ether, and 1,4-cyclohexanedimethanol monovinyl ether.

In addition, the copolymer may also contain one or more other ethylenically unsaturated comonomers copolymerized therein, including vinyl esters such as, for example, vinyl acetate and vinyl propionate; and N-vinyl amides or imides such as, for example, N-vinyl-ε-caprolactam, N-vinylpyrrolidone, and N-vinylsuccinimide.

Copolymerization of ethylenically unsaturated fluoro compound of formula (1) and vinyl ether is conducted under conditions well known to the art; see, for example, the general procedures for copolymerizing terafluoroethylene with other monomers described in U.S. Pat. No. 2,468,664 to Hanford as well as the procedures for copolymerizing fluoromonomers with vinyl ethers described in the above-cited U.S. Pat. Nos. 3,306,879 and 3,762,940. This may be either a batch process or a continuous process, which may be conducted either in solution or in an aqueous emulsion. The free radical initiator normally is either a peroxy compound or an azo compound. Typical such initiators are ammonium persulfate, lauroyl peroxide, benzoyl peroxide, and azobisisobutyronitrile. In addition, a chain transfer agent may be part of the solvent system. For example, a solvent system sometimes used in such copolymerizations is a mixture of t-butyl alcohol with methanol, where methanol also serves as the chain transfer agent. The copolymerization is carried out at a suitable temperature, normally within the range of about 50°-80° C., and under moderate pressure, which may be autogenous.

Suitable stabilizing alicyclic diketones include unsubstituted, monoalkyl-substituted, and polysubstituted, preferably dialkyl-substituted, alicyclic 1,3-diketones, where each alkyl substituent preferably has fewer than seven carbon atoms. Typical such diketones include 5,5-dimethyl-1,3-cyclohexanedione,
1,3-cyclohexanedione, 5-methyl-1,3-cyclohexanedione,
5-isopropyl-1,3-cyclohexanedione,
4-hexyl-1,3-cyclohexandione,
4,4-dimethyl-1,3-cyclohexanedione,
1,3-cyclopentanedione, and
4,4,6,6-tetramethyl-1,3-cyclohexandione.

5,5-Dimethyl-1,3-cyclohexanedione, which is the preferred alicyclic 1,3-diketone, also is known under trivial names of methone and dimedone. The name "methone" will be sometimes used herein instead of the full chemical name. Methone is a valuable reagent used in organic analysis for the preparation of solid derivatives of aldehydes.

The enolate of the stabilizing alicyclic 1,3-diketone can be, and usually will be, formed in situ by the addition of a small amount of a base unless some base already is present in the medium. The amount of base that needs to be added can be considered to be catalytic, although larger than catalytic amounts also will be suitable, but normally this will be much less than would be required to completely neutralize the enolic form of the diketone. The base used in nonaqueous systems usually will be a Lewis base, while the base used in an aqueous system usually will be a Bronsted base.

Suitable bases, if added during the copolymerization stage, should be such that would not adversely affect the copolymerization. They can be primary, secondary, or tertiary aliphatic or cycloaliphatic amines such as, for example, triethylamine, cyclohexylamine, morpholine, 2,2,6,6-tetramethylpiperidine, N-methylpiperidine, tributylamine, and 2-amino-2,4,4-trimethylpentane; and ammonia. In addition, it is known that the reaction of aldehydes with methone in an organic medium is catalyzed by even weaker bases such as amides; for example, formamide, N,N-dimethylformamide, N,N-dimethylacetamide, and N-methylpyrrolidone.

Vinyl ethers, as is well known, are unstable under acidic conditions. Hence, their free radical copolymerization normally is run on the neutral or basic side. When conducted in solution, such copolymerizations are normally conducted in a neutral medium. Copolymerizations of vinyl ethers in aqueous emulsions are usually carried out at a pH above 7, although vinyl ethers can exist for a limited time without degradation at a slightly acidic pH between about 5 and 7. The aqueous emulsion may contain, for example, alkali metal or alkali earth metal hydroxides, ammonium hydroxide, sodium acetate, alkali metal phosphates, alkali metal borates, and alkali metal carbonates. It is preferred that the aqueous medium be maintained or buffered within a pH range of about 6-10 and especially within the range of 7-9. Suitable buffer systems include $(HPO_4)^{2+}/(H_2PO_4)^-$ for a pH range of about 6-8 and $(H_2BO_3)^-/H_3BO_3$ for a pH range of about 8-10. A somewhat less effective system contains $NaHCO_3$, which can give a pH range of about 6-9. Further, a phase transfer catalyst may be added to facilitate the transfer of the enolate anion to the organic polymer phase. Such phase transfer catalysts, which are well known, may be, for example, quaternary ammonium salts where the total number of carbon atoms of the N-substituents is at least 16 or aliphatic amines having more than five carbon atoms.

The enolate anion can be associated with any suitable cation such as, for example, ammonium and substituted ammonium ions, quaternary ammonium ions, quaternary phosphonium ions, metal ions, and sulfonium ions. It is possible, of course, to preform an enolate salt of a 2,2-unsubstituted 1,3-diketone and add such salt to the copolymerization reaction or copolymer composition, rather than forming it in situ.

It is preferred, however, to form the enolate in situ; and, for best results, it is recommended that both the alicyclic diketone and the base be added at about the same time to the copolymerization reaction medium. When copolymerization is carried out in a continuous process, both the cyclic ketone and the base can be continuously metered into the reactor. If one of these compounds is added during the copolymerization, and the other one is added to the freshly prepared copolymer, good stabilization also is obtained. In such a case, it is recommended to add the diketone first and the base second because otherwise undesirable color may develop. When both the diketone and the base are added following the copolymerization, this should be done immediately thereafter for best results.

The preferred amount of alicyclic 1,3-diketone is 0.25–200 millimoles, especially 0.5–100 millimoles, per mole of vinyl ether.

While copolymers of ethylenically unsaturated fluoro compounds with vinyl ethers tend to gel on standing, copolymers of ethylenically unsaturated fluoro compounds with hydroxyl-substituted vinyl ethers tend to gel even more readily. Gelling theoretically may occur by any one of several mechanisms. While the inventor does not wish to be bound by any theory, it is believed that various polymerization mechanisms give rise to branched polymer molecules bearing one or more aldehyde groups, which arise by branching reactions and dissociative chain transfer from intermediate radicals carrying vinyl ether end groups. On standing, oxidation of some aldehyde groups or of other oxidizable species by peroxides or by atmospheric oxygen can produce acids. Remaining aldehyde groups may then undergo further reactions such as acid-catalyzed oligomerization or reaction with any alcohol present to form a hemiacetal and/or an acetal. When such reactions involve more than one aldehyde group per polymer chain, crosslinking and gelation can occur.

Stabilization of copolymers of ethylenically unsaturated fluoro compounds with vinyl ethers by means of certain amines, as described in the art, thus seems to at least prevent the occurrence of acid-catalyzed reactions; but, when amines are added to these free-radical copolymerizations, undesirable color formation often takes place.

By contrast, the process of the present invention involves a reaction of alicyclic 1,3-diketone with aldehyde, which is exemplified for methone by the following equation:

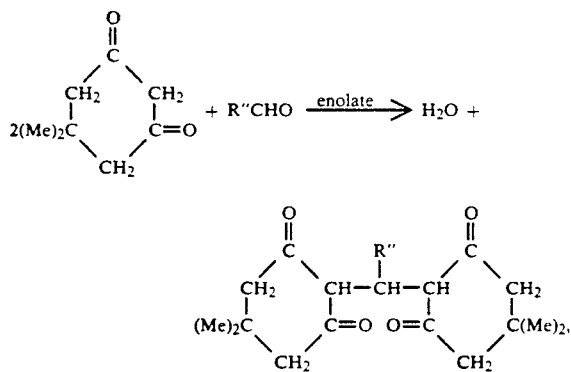

where R" is an alkyl radical, and Me is the methyl group.

The enolate ion is believed to be the true catalyst in this reaction. However, if the enolate alone were used; that is, if all alicyclic diketone were in enolate form, this stabilization reaction would be very difficult to achieve unless a suitable source of protons existed in the medium. It, therefore, is undesirable to attempt this stabilization process at a higher pH than about 10. In a less alkaline medium, even above a pH of 7, those protons can come from the diketone itself, or from the cation associated with the enolate (for example, Alkyl$_3$NH$^+$), or from the buffer system (for example, CH$_3$COOH, H$_2$PO$_4^-$, or HCO$_3^-$). The system should be able to supply a number of protons at least equivalent to those originally available from the cyclic ketone.

When an excess of diketone, based on the amount of aldehyde groups, is present, which usually will be the case within the ranges indicated, crosslinking to gel materials is no longer possible, and this inhibitory effect of diketone is permanent. The amount of base required to form the enolate which catalyzes the diketone reaction is very small, so that large amounts of base, which could result in discoloration, need not be present.

Since the most effective inhibition of crosslinking occurs when the alicyclic 1,3-diketone and base are added to the copolymerization reaction, the conditions under which the addition and stabilization take place are dependent on the conditions of the copolymerization reaction itself. In other cases, the copolymer to be stabilized may be present in solution in a solvent or may be dispersed in water or in a water-containing medium. The temperature of the diketone addition in such cases is not critical and normally will be somewhere within the range of about room temperature to about 80° C. The diketone and the base may be added simultaneously or separately, in either order.

This invention is now illustrated by the following examples of certain representative embodiments thereof, where all percentages are by volume.

COMPARATIVE EXAMPLE

A 400 ml Hastelloy ® shaker tube was charged with a solution of 0.15 g of azobisisobutyronitrile and 26.0 g of 4-hydroxybutyl vinyl ether in 200 g of reagent-grade ethyl acetate. The tube was chilled with dry ice and evacuated with a mechanical pump; then, 13.0 g of methyl vinyl ether and 50.0 g of tetrafluoroethylene were charged. The tube was closed and shaken for 5 hours at 65° C. The resulting copolymer was precipitated from the solution by pouring the solution into aqueous 40% methanol with good stirring. This product was washed with water and gently dried with a slow nitrogen sweep in a vacuum oven at 50° C. The dry copolymer, weighing 53.2 g, was completely insoluble in tetrahydrofuran and thus was crosslinked.

EXAMPLE 1

The procedure of Comparative Example was repeated with the same amounts of the starting materials, except that in this case 2 g of methone and 0.30 g of triethylamine were added at the end of copolymerization. The resulting solution was allowed to stand at room temperature for 5 more hours. The copolymer was precipitated with aqueous 40% methanol as before, washed with water, and gently dried in a vacuum oven as before. It weighed 62.7 g and was marginally soluble in tetrahydrofuran.

EXAMPLE 2

The procedure of Comparative Example was repeated with the same amounts of the starting materials, except that 0.30 g of triethylamine also was present in the reactor. To the resulting copolymer solution there was added 2.0 g of methone, and the solution was allowed to stand at room temperature for 5 additional hours. The copolymer was precipitated as before and was dried in a vacuum oven at 100° C. with a slow nitrogen sweep. It weighed 64.0 g and was completely soluble in tetrahydrofuran.

EXAMPLE 3

The procedure of Comparative Example was repeated with the same amounts of the starting materials, except that 2 g of methone also was present in the reactor. To the resulting copolymer solution there was added 0.30 g of triethylamine, and the solution was allowed to stand at room temperature for 5 additional hours. The copolymer was precipitated as before and was dried in a vacuum oven at 100° C. with a slow nitrogen sweep. It weighed 63.5 g and was completely soluble in tetrahydrofuran.

EXAMPLE 4

A 400 ml Hastelloy ® shaker tube was charged with 0.30 g of triethylamine, 0.2 g of methone, and a solution of 0.15 g of azobisisobutyronitrile and 26.0 g of 4-hydroxybutyl vinyl ether in 200 g of reagent-grade ethyl acetate. The tube was chilled and evacuated as before; then, 13.0 g of methyl vinyl ether and 50.0 g of tetrafluoroethylene were charged. The tube was closed and shaken for 5 hours at 65° C. The resulting copolymer was precipitated from the solution by adding the solution with good stirring to aqueous 40% methanol. This product was washed with water and dried with a slow nitrogen sweep in a vacuum oven at 100° C. The dry copolymer, weighing 46.0 g, was completely soluble in tetrahydrofuran.

I claim:

1. A process for stabilizing against gel formation a copolymer of the following comonomers in their approximate proportions given below:
   (1) 10–60 mole percent of at least one ethylenically unsaturated fluoro compound represented by the formula (1)

where each one of W, X, Y, and Z substituents can be a fluorine atom; provided that at least two of W, X, Y, and Z substituents are fluorine atoms; at most two of W, X, Y, and Z substituents can be independently H, Cl, or -OR$_f$, where R$_f$ is a C$_1$-C$_{12}$ fluoroalkyl group; provided that two -OR$_f$ groups joined together can be part of a cyclic structure; and
   at most one of W, X, Y, and Z substituents can be Br or -CF$_2$R$_f'$, where R$_f'$ is a C$_1$-C$_{12}$ fluoroalkyl group;
   provided that each one of R$_f$ and R$_f'$ may be further substituted with one or more functional groups providing cure sites;
   (2) 10–60 mole percent of at least one vinyl ether of formula CH$_2$=CH-O-R, wherein R is a C$_1$-C$_{18}$ aliphatic or alicyclic group, which may be further substituted with one or more functional groups that do not inhibit free radical copolymerization, including functional groups that provide cure sites; and
   (3) 0–80 mole percent of at least one other ethylenically unsaturated comonomer that does not substantially increase the risk of gelation,
   the total amount of all the above monomers adding up to 100 mole percent;
   said process comprising adding either to the free-radical copolymerization reaction or to the copolymer a stabilizing amount of about 0.1–400 millimoles of a 2,2-unsubstituted alicyclic 1,3-diketone per mole of vinyl ether, whether the vinyl ether is present as a comonomer in the copolymerization reaction or as a copolymerized comonomer in the copolymer, in the presence of the enolate ion of said diketone; provided that, when the stabilization is performed in an aqueous medium, the pH of the aqueous medium must be at all times maintained at at least about 5 but not over about 10.

2. The process of claim 1 wherein R in the formula of vinyl ether is selected from the group consisting of alkyl, cycloalkyl, haloalkyl, and hydroxyalkyl groups.

3. The process of claim 1 wherein the fluoro compound of formula (1) has functional groups that provide cure sites.

4. The process of claim 3 wherein the functional groups are selected from the group consisting of nitrile and ester groups and bromine and iodine atoms.

5. The process of claim 1 wherein a 2,2-unsubstituted alicyclic 1,3-diketone and a base are added to the copolymerization reaction or to the copolymer to form the enolate in situ.

6. The process of claim 5, wherein both the diketone and the base are added at the beginning of a batch copolymerization reaction.

7. The process of claim 5 wherein one of the diketone and the base is added at the beginning of a batch copolymerization reaction and the other one at the end of the copolymerization reaction.

8. The process of claim 5 wherein both components are added at the end of a batch copolymerization reaction.

9. The process of claim 5 wherein both the diketone and the base are added continuously to a continuous copolymerization reaction.

10. The process of claim 1 wherein the amount of alicyclic 1,3-diketone is 0.25–200 millimoles per mole of vinyl ether.

11. The process of claim 10 wherein the amount of alicyclic 1,3-diketone is 0.5–100 millimoles per mole of vinyl ether.

12. The process of claim 1 wherein the alicyclic diketone is 5,5-dimethyl-1,3-cyclohexanedione.

13. The process of claim 1 wherein the copolymer also contains at least one comonomer other than fluoro compound of formula (1) and vinyl ether copolymerized therein.

14. The process of claim 1 wherein the stabilization is carried out in an aqueous system at a pH of about 6–10.

15. The process of claim 14 wherein the pH is about 7–9.

16. A process for stabilizing a composition selected from the group consisting of solutions and dispersions comprising a copolymer of the following comonomers in their approximate proportions given below:
   (1) 10–60 mole percent of at least one ethylenically unsaturated fluoro compound represented by the formula (1)

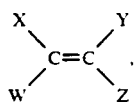

(1)

where each one of W, X, Y, and Z substituents can be a fluorine atom; provided that at least two of W, X, Y, and Z substituents are fluorine atoms;

at most two of W, X, Y, and Z substituents can be independently H, Cl, or -$OR_f$, where $R_f$ is a $C_1$-$C_{12}$ fluoroalkyl group; provided that two -$OR_f$ groups joined together can be part of a cyclic structure; and at most one of W, X, Y, and Z substituents can be Br or -$CF_2R_f'$, where $R_f'$ is a $C_1$-$C_{12}$ fluoroalkyl group;

provided that each one of $R_f$ and $R_f'$ may be further substituted with one or more functional groups providing cure sites;

(2) 10-60 mole percent of at least one vinyl ether of formula $CH_2=CH$-O-R, wherein R is a $C_1$-$C_{18}$ aliphatic or alicyclic group, which may be further substituted with one or more functional groups that do not inhibit free radical copolymerization, including functional groups that provide cure sites; and (3) 0-80 mole percent of at least one other ethylenically unsaturated comonomer that does not substantially increase the risk of gelation, the total amount of all the above monomers adding up to 100 mole percent;

said process comprising adding to the composition a stabilizing amount of about 0.1-400 millimoles of a 2,2-unsubstituted alicyclic 1,3-diketone per mole of copolymerized vinyl ether in the presence of the enolate ion of said diketone; provided that, when the stabilization is performed in an aqueous medium, the pH of the aqueous medium must be at all times maintained at least about 5 but not over about 10.

17. A composition stabilized according to the process of claim 1.

18. A composition stabilized according to the process of claim 5.

19. A composition stabilized according to the process of claim 6.

20. A composition stabilized according to the process of claim 7.

21. A composition stabilized according to the process of claim 8.

22. A composition stabilized according to the process of claim 9.

23. A composition stabilized according to the process of claim 10.

24. A composition stabilized according to the process of claim 12.

25. A composition stabilized according to the process of claim 14.

* * * * *